United States Patent
Runge et al.

[11] Patent Number: 5,688,204
[45] Date of Patent: Nov. 18, 1997

[54] SHIFTING DEVICE FOR A MOTOR VEHICLE CONTINUOUSLY VARIABLE TRANSMISSION

[75] Inventors: Wolfgang Runge, Ravensburg; Walter Frei; Anton Welte, both of Friedrichshafen, all of Germany

[73] Assignee: ZF Friedrichshafen AG, Friedrichshafen, Germany

[21] Appl. No.: 537,842

[22] PCT Filed: Apr. 18, 1994

[86] PCT No.: PCT/EP94/01188

§ 371 Date: Oct. 19, 1995

§ 102(e) Date: Oct. 19, 1995

[87] PCT Pub. No.: WO94/24463

PCT Pub. Date: Oct. 27, 1994

[30] Foreign Application Priority Data

Apr. 20, 1993 [DE] Germany .................. 43 12 718.5

[51] Int. Cl.$^6$ .................................................. B60K 41/12
[52] U.S. Cl. ............................ 477/46; 477/43; 474/18
[58] Field of Search .................... 74/336 R; 477/37, 477/43, 46, 49; 474/18, 28

[56] References Cited

U.S. PATENT DOCUMENTS

| | | | |
|---|---|---|---|
| 4,671,138 | 6/1987 | Nobumoto et al. | 477/43 X |
| 4,672,864 | 6/1987 | Morimoto | 477/43 X |
| 4,782,934 | 11/1988 | Takano et al. | 477/49 X |
| 4,827,803 | 5/1989 | Miyawaki | 477/49 |
| 4,843,913 | 7/1989 | Miyawaki | 477/49 |
| 4,861,318 | 8/1989 | Van Beek et al. | 474/18 |
| 4,967,621 | 11/1990 | Soga et al. | 477/49 |
| 5,009,127 | 4/1991 | Morimoto et al. | 477/49 |
| 5,427,579 | 6/1995 | Kanehara et al. | 474/28 |
| 5,474,505 | 12/1995 | Seidel et al. | 477/49 |

FOREIGN PATENT DOCUMENTS

| | | |
|---|---|---|
| 0232686 | 8/1987 | European Pat. Off. |
| 0305156 | 3/1989 | European Pat. Off. |
| 0574968 | 12/1993 | European Pat. Off. |
| 0588828 | 3/1995 | European Pat. Off. |
| WO 90/04119 | 4/1990 | WIPO |

*Primary Examiner*—Charles A. Marmor
*Assistant Examiner*—Peter T. Kwon
*Attorney, Agent, or Firm*—Davis and Bujold

[57] ABSTRACT

In a shifting device such as generally used in automatic transmissions, a regulating device (15) is provided by the swiveling of which to a shifting gate (13) the automatic multiplication stages can be preselected. Besides, the regulating device can be transferred to a second shifting gate (14) via a transverse gate (17). According to the invention, in the second shifting gate (14) a characteristic field (1) is influenced by a continuously variable incremental or decremental change of individual operation parameters or a combination of at least two parameters. The operation parameters consist of the engine speed, the transmission ratio and the output speed.

8 Claims, 2 Drawing Sheets

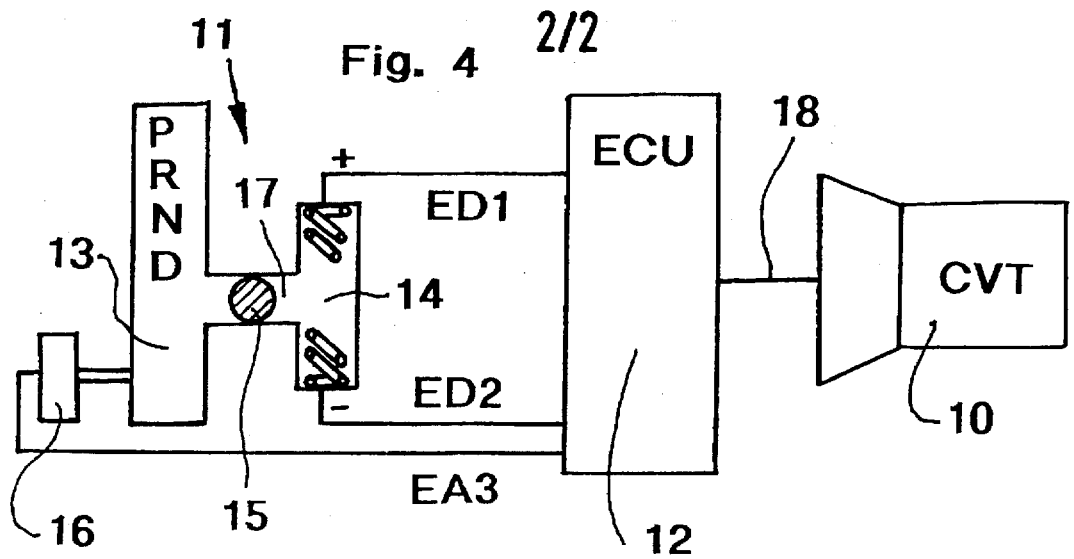
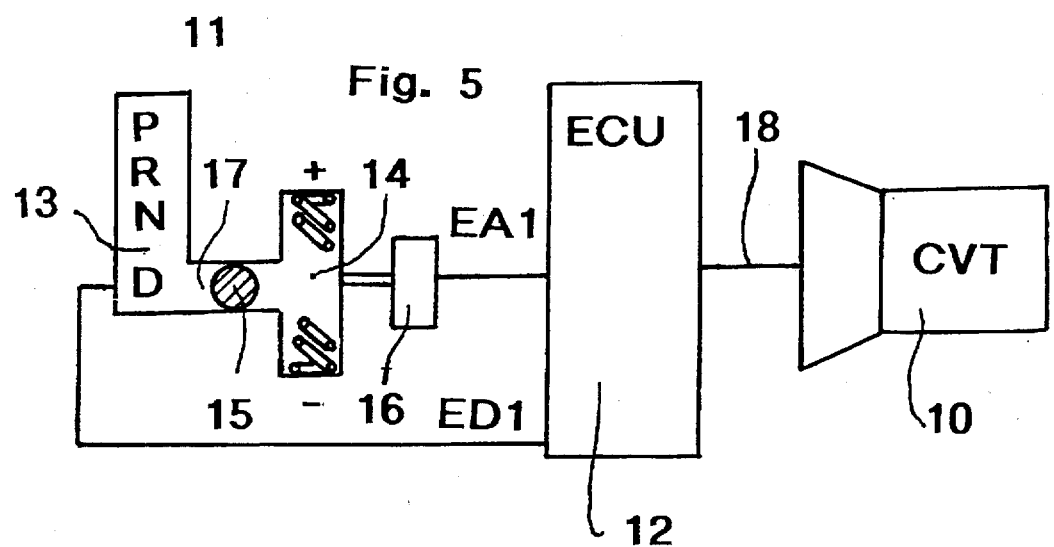
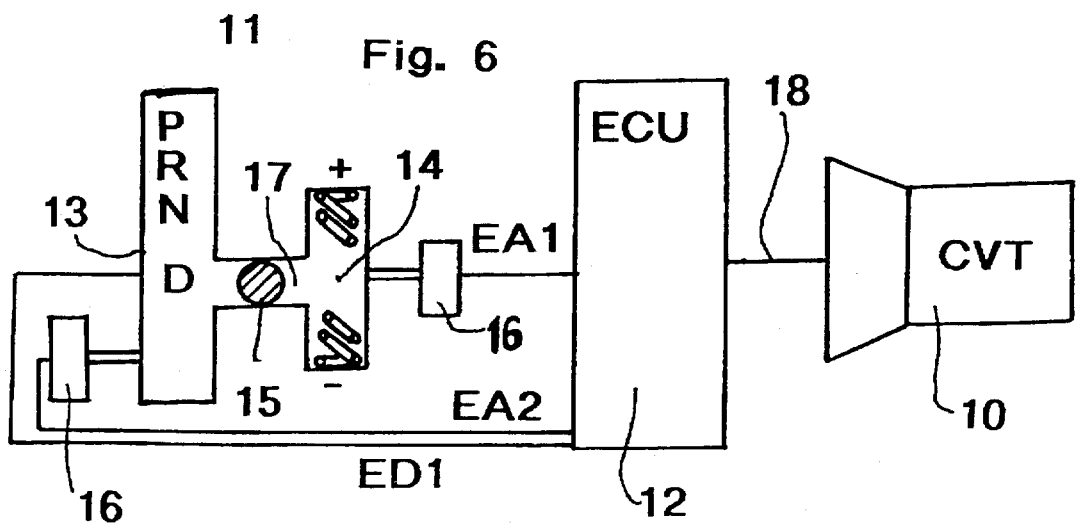

SHIFTING DEVICE FOR A MOTOR VEHICLE CONTINUOUSLY VARIABLE TRANSMISSION

The invention refers to a shifting device for a continuously variable transmission of a motor vehicle where the ratio of the transmission is automatically selected in an operating mode, and adjusted by an electronic unit through signals from a regulating device depending on the operation parameters of the motor vehicle. In another operating mode, the driver can effect a manual engagement in which an operation parameter is changed by the regulating device.

BACKGROUND OF THE INVENTION

DE-A-39 32 720 has disclosed a regulating device. It has a selector lever with which a speed range can be reduced. In the device known already, the ratio or the engine speed is downwardly limited. A disadvantage of this known system is that the possibility of the driver having an influence is greatly reduced by the preset range limits. Beside, it is not to be understood from said prior art how a combination of several operation parameters could be possible.

SUMMARY OF THE INVENTION

The invention is based on the problem of providing a shifting device for a continuously variable transmission of a motor vehicle with which it is possible to influence, by manual engagement, the characteristic field of a speed range.

Fundamentally aside from the configuration of the shifting device for a continuously variable transmission, the solution of the stated problem consists in that in the additional operating mode, the working point can be controlled by a continuously variable or incremental or decremental change of individual operation parameters or a combination of at least two operation parameters. Said operation parameters consist of the engine speed, the transmission ratio and the output speed.

It is of a particular advantage to form the operation parameters, for influencing the working point, from a combination of the engine speed and the transmission ratio, or from a combination of the engine speed with the output speed, or from a combination of all three parameters. When said two parameters are actually combined, an excellent travel behavior, especially in mountainous terrains, results in relation to a manual engagement. When ascending mountains, undesirable shift changes are prevented while, when descending mountains, the braking effect of the engine can be fully utilized.

With the combination of the output speed, it is additionally possible to maintain a desired road speed, in a certain range, when needed.

In a shifting device such as conventionally used in automatic transmissions, a regulating device is provided the swiveling of which to a shifting gate makes it possible to preselect the automatic multiplication stages. The regulating device can be further transferred to a second shifting gate through a transverse gate. In another solution of the stated problem, by swiveling the regulating device to the second gate, the limits of a characteristic field can be changed by the combination of the engine speed and the transmission ratio.

By swiveling the regulating device to the second gate, analog or digital output signals are produced which are passed on to the electronic control unit. In a preferred embodiment, said output signals effect a uniform (absolute) change according to a value of at least one operation parameter, such as the engine speed or the transmission ratio. Unlike in the shifting devices already known (for instance, DE-A-41 20 540), said change is not a function of the working point (and thus more or less great) but always uniform. Therefore, the result of a shifting operation is always foreseeable for the driver. The manually effected change can also be produced by a time-dependent function. The change is then primarily a function of the duration of the activation. The result of a manual actuation is then also readily foreseeable for the driver.

In another preferred embodiment, the digital signals are combined by the control unit to form an output signal which takes into account at least the engine speed and transmission ratio operation parameters. In this manner, it is ensured that by a digital or an analog signal, in the plus or the minus direction, it is possible notwithstanding to combine several operation parameters to form an adjusting signal for the regulating device of a continuously variable transmission.

To obtain a tempomat function, in addition, it is advantageous to adjust a constant output speed of the transmission at an engine speed changing continuously variably or incrementally.

An especially favorable travel behavior is obtained by combination of two operation parameters by the fact that, depending on the duration-in case of incremental actuation-the change of pulses, a comparatively great change of the engine speed is first effected while the limitation of the transmission ratio is kept comparatively small. In the case of a long-maintained actuation or increasing number of pulses, the engine speed must be changed less sharply while the transmission ratio must be adjusted with sharply increasing tendency. From the tendencies shown, a differential signal can be obtained which imparts a very good subjective driving feeling, especially in mountainous terrains.

BRIEF DESCRIPTION OF THE DRAWING(S)

Other essential features of the invention and the advantages resulting therefrom are to be understood from the description that follows of several embodiments. In the drawings:

FIG. 4 to FIG. 6 are diagrammatic illustration of a regulating device for an automatic continuously variable transmission with two shifting gates and an electronic control unit.

DESCRIPTION OF THE PREFERRED EMBODIMENT(S)

Figure 1:
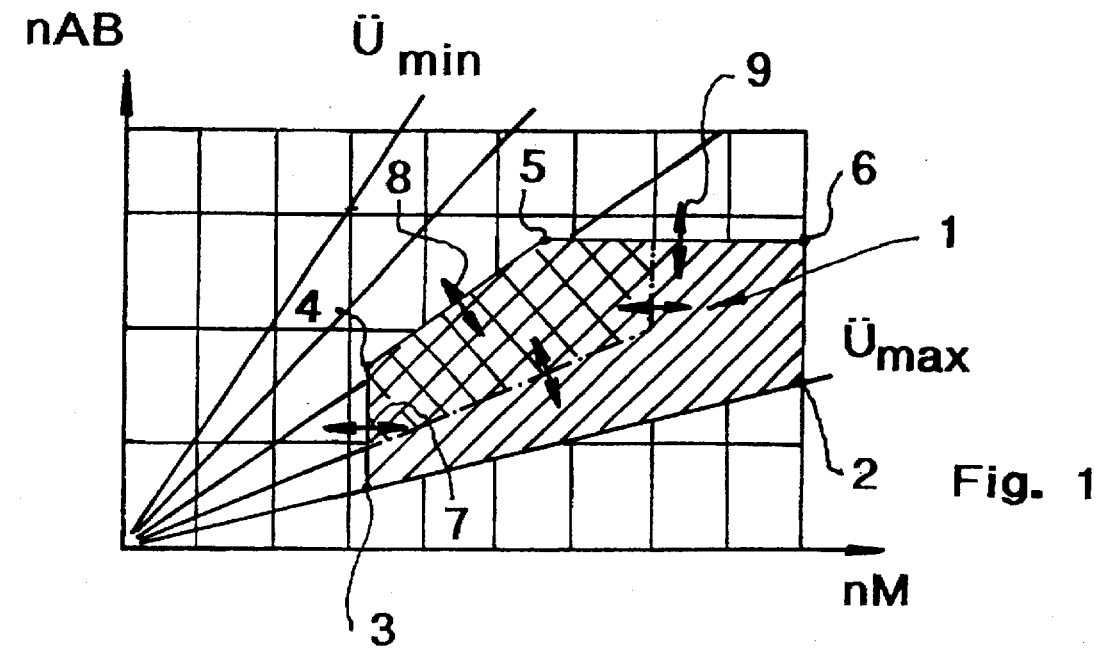
FIG. 1 is a simplified graphic illustration of a driving range influence.

In FIG. 1, the output speed $n_{AB}$ (Y-axis) of a continuously variable transmission is traced in a diagram over the engine speed nM (X-axis). The range of ratios of the continuously variable transmission lies between the radiating lines $U_{min}$ (longest transmission ratio, that is, highest output speed $n_{AB}$) and $U_{max}$ (shortest transmission ratio in the range of lower output speeds $n_{AB}$).

The whole range of transmission ratios of the continuously variable transmission for normal ahead travel lies between the lines $U_{min}$ and $U_{max}$. Varying ratios are indicated by the additionally plotted beam of rays.

In the illustration, a characteristic field is especially highlighted by the hatched area. The working point of the engine-transmission combination is within said characteristic field. The working point can be adjusted manually or incrementally or decrementally changed in the whole characteristic field 1. The characteristic field 1 has the shape of a pentagon and is defined by the following limiting lines: a limited line 2-3 with which a high transmission ratio is defined (in this embodiment said transmission ratio corresponds to the highest transmission ratio $U_{max}$ of the continuously variable transmission), a limited line 3-4 which can extend vertically, for instance, and defines a specific lower limit of the engine speeds nM, a limiting line 4-5 with which is limited a low transmission ratio and finally a limiting line 5-6 with which an output speed $n_{AB}$ or indirectly a speed is established.

It is made clear, with the double arrows 7 (limiting line 3-4), 8 (limiting line 4-5) and 9 (limiting line 5-6), that one objective of this invention consists in changing the position of said limiting lines to one or the other side. The inwardly oriented arrows-related to the hatched area-define here a plus direction while the outwardly oriented arrows reproduce a minus direction.

If the limiting line 3-4 is shifted in the plus direction, a displacement of the lower limit of the engine speeds nM upwardly, in direction toward higher absolute values, results. A shift of the limiting line 3-4 in the minus direction, on the other hand, causes the engine speed nM to be downwardly limited at low absolute values.

When the limiting line 4-5 is shifted in the plus direction, the lower limit of the attainable minimum ratios is displaced in $U_{max}$ direction. In other words, the attainable output speed values $n_{AB}$ become smaller. A shift in the minus direction results in the attainable transmission ratio being displaced in $U_{min}$ direction, that is, the attainable output speeds $n_{AB}$ become higher as the engine speed Nm increases.

When the limiting line 5-6 is shifted in the plus direction, an attainable output speed $n_{AB}$ is limited in a direction "to become lower" while a shift in the minus direction increases the attainable output speed $n_{AB}$. Together with the primarily intended function for said line of limiting a specific output speed $n_{AB}$ upwardly, it is possible to interpret said limiting line 5-6 as a desired value condition so that the motor vehicle is driven by the continuously variable transmission at a selectable constant output speed $n_{AB}$ (tempomat function).

It is continuously advantageous to shift the limiting line 3-4 or 5-6 incrementally or decrementally and/or by analogous parameters. It can be an advantage here if the corresponding adjustment speeds are changed incrementally or decrementally along the curve of the most favorable fuel consumption in the engine characteristic field. Then only one parameter is independently presettable. The change of at least one operation parameter by manual engagement can also be time dependent. The change then depends on the duration of actuation.

The continuously variable transmission 10 is controlled by regulating device 11 via an electronic control unit 12 (see FIG. 4).

It is particularly advantageous if not only individual operation parameters such as engine speed nM, transmission ratio U, or the output speed $n_{AB}$ are influenced step by step or continuously variably in the sense of a change of the characteristic field of FIG. 1. Of especial advantage is at least one combination of the operation parameters of the engine speed nM with the transmission ratio of the continuously variable transmission 10. Said two operation parameters are combined in the electronic control unit 12 in a manner such that at least two characteristic lines are interconnected. The diagrams of FIG. 2 and 3, which make clear the tendential adjustment strategy, show how this can take place.

Figure 2:
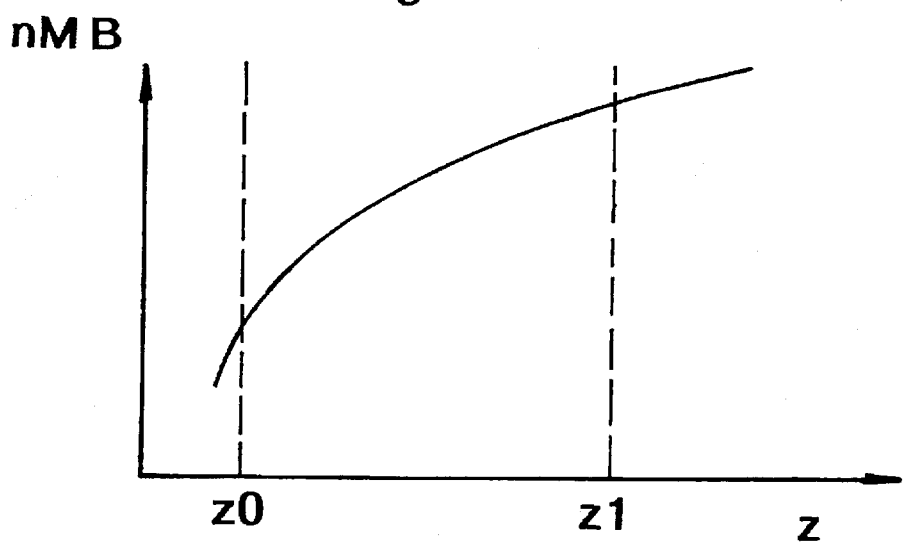
FIG. 2 is an illustration of a characteristic line for limitation of the engine speed depending on a number of pulses.
Figure 3:
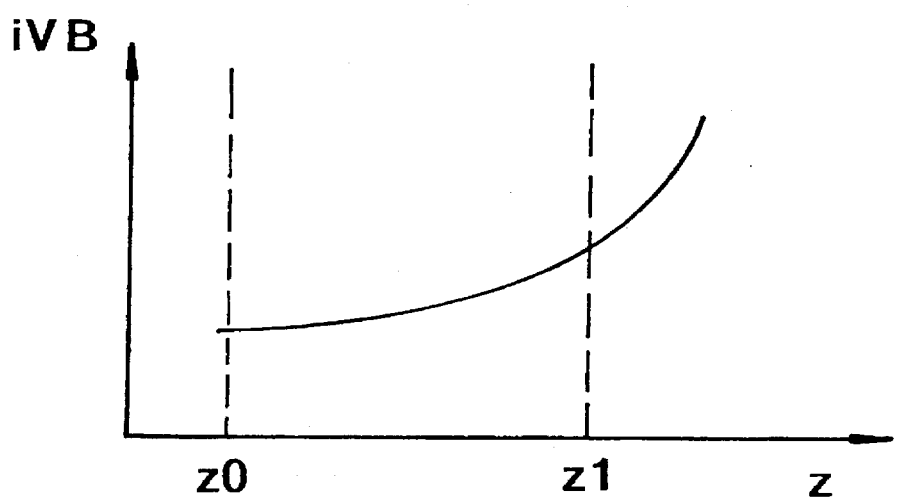
FIG. 3 is an illustration of a characteristic line for limitation of the transmission ratio depending on a number of pulses.

In FIG. 2, the change of the engine speed which is designated nMB is plotted, by the number of adjustment pulses Z or the duration of an actuation. When actuating a regulating device 15 in the plus direction, a noticeable shifting of the limiting line 3-4 occurs already at a relative small number of pulses Z likewise in the plus direction. Upon increasing the number of pulses Z, the characteristic line shows a diminishing tendency to change the engine speed nM. The lower limit of the engine speed nM accordingly is less sharply increased.

The adjustment of the ratio of the continuously variable transmission behaves opposite to the above. In the first place, the transmission ratio is relatively weakly changed ascending in the $U_{max}$ direction while with increasing pulse sequence an over-proportionally ascending shift of the transmission ratio in the direction to the maximum ratio of the continuously variable transmission sets in. It is advantageous to combine with each other, by the electronic control unit 12, at least the engine speed nM and the transmission ratio U operation parameters. A combination in which no linear interrelationship exists has proved particularly advantageous, but in it a different valuation of individual operation parameters results, as has been explained with the reference to the characteristic lines of FIG. 2 and 3.

Together with the combinations described, an additional relationship to output speed $n_{AB}$ or to driving speed can be produced in the electronic unit 12. In a possible mode of operation only the output speed $n_{AB}$ is given and kept at a constant value. Said mode of operation is comparable with the known operation of a stepped transmission known by the designation Tempomat.

In FIG. 4, the basic construction of a shifting device, according to the invention, is reproduced in a diagrammatic, very simplified manner. The shifting device 11 has two shifting gates 13 and 14. In the shifting gate 13, one of the selection positions P, R, N, D is preselected by a regulating device 15. In the lower range of the shifting gate 13, an analog output signal EA3 can be produced by the regulating device 15. For this purpose the regulating device 15 could be connected, for instance, with a potentiometer 16. The shifting gate 13 can be exited via a transverse gate 17. The adjusting device 15 then drops to a second shifting gate 14. By swiveling the regulating device 15, it is possible to produce a plus signal by contact with a sensor lying above, in the drawing, and a minus signal in a position lying below in the drawing. These can be digital signals ED1 and ED2. The regulating device 15 is held in the shifting gate 14 in a middle spring-loaded position.

Contacting the upper or lower sensor one or several times produces at least one pulse in a plus or a minus direction. Transferred to the diagram of FIG. 1, this means a narrowing of the characteristic field 1 in the plus direction or an enlargement of the characteristic field 1 in the opposite direction.

The digital signals ED1 and ED2 and the analog signal EA3 enter an electronic control unit 12 (ECU). At least one signaling line 18 leads from the electronic control unit 12 to the continuously variable transmission 10 (CVT). The control unit for the engine engagement could also be attached to said signaling line.

The digital input signal ED1 can basically be a plus signal which can be further changed within the electronic control unit 12 in order to be passed on as a plus signal via the signaling line 18 to the regulating device for the continuously variable transmission 10. The same applies to the digital input signal ED2. A conversion of the input signals could, as explained, result from the combination of two characteristic lines. The adjusting signal passed on via the signaling line 18 corresponds then to a differential signal.

In the arrangement of FIG. 5, the regulating device 15 produces, so far as moved in the shifting gate 14, an analog output signal EA1. The signals, for the transmission ratio to be automatically engaged, enter the electronic control unit 12 as digital input signals ED1.

The embodiment of FIG. 6 fundamentally refers to a combination of the embodiments of FIG. 4 and 5. The transmission ratios to be automatically engaged are digitally fed to the electronic control unit 12. The potentiometer 16 is provided for the continuously variable selection of individual travel ranges. It produces an analogous input signal EA2.

Common to all embodiments is the circumstance that by actuating the regulating device 15 within the second shifting gate 14, either digital or analog signals in the plus or the minus direction are produced. It is possible to change, by said signals, individual operation parameters such as the engine speed, the transmission ratio, or the output speed of the continuously variable transmission 10. In order that a characteristic field can be modified in the second shifting gate 14, a plus or a minus signal is produced which can undergo an additional conversion in the electronic control unit. For driving on mountainous terrain it has proved especially favorable to combine the engine speed nM and transmission ratio U operation parameters. A localization of the characteristic field in the plus direction prevents undesirable switching, when ascending mountains, while the braking action of the engine can be fully utilized when descending mountains. When driving on a level road, it has proved favorable to select, by means of the potentiometer 16 over a continuously variable possibility of adjustment, a specific driving speed which is then maintained by changing the transmission ratio to a constant level.

The characteristic field 1 plotted in FIG. 1, which corresponds to a working range of the continuously adjustable transmission, can be varied by the influence of a low engine speed, a low transmission ratio and an output speed of the transmission. Within said characteristic field is indicated, by dotted lines and by the plotted double hatching, another variation of the shifting device according to the invention. In this possible variation the upper limit of the transmission ratio and of the engine speed are additionally influence, which is made clear by the plotted double arrow.

In the simplest embodiment, the characteristic field is changed by changing only one of the operation parameters such as a low engine speed. The adjustment of a lower transmission ratio can be added to said operation parameter. Finally, the combination of engine speed, transmission ratio and output speed operation parameters is possible. As shown by the characteristic field highlighted by the double hatch other variations are possible in the sense that, for instance, an upper limit of the transmission ratio and/or an upper limit of the engine speed can also be adjusted.

A special advantage of the arrangements explained above is, in particular, to be observed in an improvement of the subjective driving feeling (drivability) by the possibility of manual selection, especially a lower engine speed combined with the intended control of the reduction ratio.

Referenced Numeral 1 characteristic field
2-3 limiting line
3-4 limiting line
4-5 limiting line
5-6 limiting line
7 double arrow
8 double arrow
9 double arrow
10 continuously variable transmission
11 shifting device
12 electronic control unit
13 shifting gate
14 shifting gate
15 regulating device
16 potentiometer
17 transverse gate
18 signaling line

We claim:

1. A shifting device (11) for a continuously variable transmission (10) of a motor vehicle, said shifting device (11) including a manually actuatable regulating device (15) for, during an operating mode, automatically selecting and adjusting a ratio of said continuously variable transmission (10), depending on operational parameters of the motor vehicle and, during an additional operating mode, allowing manual actuation of said regulating device (15);

wherein said operational parameters of the motor vehicle consist of the engine speed (nM), the transmission ratio (U) and the output speed ($n_{AB}$) and, during said additional mode of operation, a characteristic field (1) is influenceable by a change of at least one individual operational parameter of the motor vehicle, and actuation of said regulating device (15) supplies at least one of an analog and a digital output signal to an electronic control unit (12) coupled to said regulating device (15).

2. A shifting device according to claim 1, wherein at least one of said analog and digital signals can be combined by said electronic control unit (12) to form one output signal which takes into account at least the engine speed (nM) and the transmission ratio (U) operational parameters.

3. A shifting device according to claim 1, wherein a constant output speed ($n_{AB}$) of the transmission is manually changeable at a changing engine speed (nM).

4. A shifting device according to claim 1, wherein a relatively shortly duration of actuation of said regulating device (15) produces a comparatively greater change in the engine speed while adjustment of the transmission ratio is comparatively smaller, while a relatively longer duration of actuation of said regulating device (15) decreases the engine speed decreases while adjustment of the transmission ratio increases with a sharply rising tendency.

5. A shifting device according to claim 1, wherein a relatively large number of pulses, produced by actuation of said regulating device (15), produces a comparatively greater change in the engine speed while adjustment of the transmission ratio is comparatively smaller, while a relatively smaller number of pulses, produced by actuation of said regulating device (15), decreases the engine speed decreases while adjustment of the transmission ratio increases with a sharply rising tendency.

6. A shifting device according to claim 4, wherein actuation of said regulating device (15) is continuous and the duration of actuation is measured in seconds.

7. A shifting device according to claim 5, wherein actuation of said regulating device (15) is intermittent and the duration of actuation is measured in number of pulses (Z).

8. A shifting device (11) for a continuously variable transmission (10) of a motor vehicle, said shifting device (11) including a manually actuatable regulating device (15) for, during an operating mode, automatically selecting and adjusting a ratio of said continuously variable transmission (10), via signals, depending on operational parameters of the motor vehicle and, during an additional operating mode, allowing manual actuation of said regulating device (15); wherein said operational parameters of the motor vehicle consist of the engine speed (nM), the transmission ratio (U) and the output speed ($n_{AB}$) and, during said additional mode of operation, a characteristic field (1) is influenceable by a change of at least one individual operational parameter of the motor vehicle and, during manual actuation of said regulating device (15), a working point within the characteristic field (1) is one of incrementally adjustable and continuously variable adjustable.

* * * * *